United States Patent
Windle et al.

(10) Patent No.: US 9,917,696 B2
(45) Date of Patent: Mar. 13, 2018

(54) SECURE KEY COMPONENT AND PIN ENTRY

(71) Applicant: Hewlett-Packard Development Company, L.P., Houston, TX (US)

(72) Inventors: Chris A. Windle, Sunnyvale, CA (US); Vladimir Libershteyn, Sunnyvale, CA (US); Richard Liu, Sunnyvale, CA (US)

(73) Assignee: EntIT Software, LLC, Sunnyvale, CA (US)

( * ) Notice: Subject to any disclaimer, the term of this patent is extended or adjusted under 35 U.S.C. 154(b) by 193 days.

(21) Appl. No.: 14/817,978

(22) Filed: Aug. 4, 2015

(65) Prior Publication Data

US 2017/0041143 A1    Feb. 9, 2017

(51) Int. Cl.
  *G06F 21/34* (2013.01)
  *H04L 9/32* (2006.01)
  *H04L 9/08* (2006.01)

(52) U.S. Cl.
  CPC ............ *H04L 9/3234* (2013.01); *G06F 21/34* (2013.01); *H04L 9/0877* (2013.01); *H04L 9/0897* (2013.01); *H04L 9/3226* (2013.01)

(58) Field of Classification Search
  CPC ....... G06F 21/34; G06F 21/36; H04L 9/3234; G07F 7/0873; G07F 7/1008; G07F 7/1016
  See application file for complete search history.

(56) References Cited

U.S. PATENT DOCUMENTS

| | | | |
|---|---|---|---|
| 5,768,389 A * | 6/1998 | Ishii ..................... | H04L 9/0897 380/277 |
| 7,269,733 B1 | 9/2007 | O'Toole, Jr. | |
| 8,966,268 B2 * | 2/2015 | Marien ................... | G06F 21/34 713/172 |
| 2001/0036275 A1 * | 11/2001 | Murakami ............ | H04L 9/0847 380/277 |
| 2004/0039503 A1 * | 2/2004 | Doyle .................... | G07C 5/085 701/32.6 |
| 2008/0022874 A1 * | 1/2008 | Silverbrook ......... | B41J 2/14427 101/330 |
| 2010/0185863 A1 | 7/2010 | Rabin et al. | |
| 2010/0223403 A1 * | 9/2010 | Chau ..................... | G06K 19/07 710/14 |
| 2010/0228683 A1 | 9/2010 | Ansley et al. | |
| 2010/0228996 A1 | 9/2010 | Ginter et al. | |
| 2014/0068246 A1 | 3/2014 | Hartley et al. | |

* cited by examiner

*Primary Examiner* — Eleni Shiferaw
*Assistant Examiner* — Paul Callahan (57) ABSTRACT

According to an example, secure key component and PIN entry may include receiving a communication from a smart card control device upon connection of the smart card control device with a secure key component and PIN entry apparatus. The communication may be related to storage of a key component on a smart card that is communicatively connectable to the apparatus. The key component may be related to a Master File Key (MFK) that is formed by using a plurality of key components including the key component. In response to the communication, the smart card may be prompted to generate the key component, or entry of the key component may be received based on actuation of a keypad of the apparatus. Further, the generated or received key component may be stored on the smart card upon connection of the smart card with the apparatus.

20 Claims, 12 Drawing Sheets

RECEIVE A COMMUNICATION FROM A SMART CARD CONTROL DEVICE UPON CONNECTION OF THE SMART CARD CONTROL DEVICE WITH A SECURE KEY COMPONENT AND PIN ENTRY APPARATUS
902

IN RESPONSE TO THE COMMUNICATION, PROMPT THE SMART CARD TO GENERATE THE KEY COMPONENT, OR RECEIVE ENTRY OF THE KEY COMPONENT BASED ON ACTUATION OF A KEYPAD OF THE APPARATUS
904

STORE THE GENERATED OR RECEIVED KEY COMPONENT ON THE SMART CARD UPON CONNECTION OF THE SMART CARD WITH THE APPARATUS
906

SECURE KEY COMPONENT AND PIN ENTRY

BACKGROUND

A key may be used in cryptography to determine the functional output of a cryptographic process or cipher. Without a key, the process may produce useless results. With respect to encryption, a key facilitates the particular transformation of plaintext into ciphertext, or vice versa during decryption. A key may also be used in a variety of cryptographic processes, such as digital signature schemes and message authentication codes.

A personal identification number (PIN) is typically a numeric password shared between a user and a system for authenticating the user to the system. Once the user is authenticated, the system may securely communicate with another system by using a key. Typically, the user provides a non-confidential user identifier and a confidential PIN to gain access to the system. The user may be granted access to the system when the PIN entered matches a corresponding number stored in the system.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A smart card control device, such as a tablet, may be used with a hardware security module to provide a safe way to store key components onto smart cards (e.g., one key component per smart card for a particular Master File Key (MFK)), and to load the key components from the smart cards onto the hardware security module to create the MFK. At the hardware security module, the MFK may be generated by combining (e.g., by using an XOR operation) the key components from the smart cards associated with the MFK.

When the key components are being entered in the smart card control device, the key components briefly live in the clear in the smart card control device memory, and may be compromised. Various security techniques such as the addition of security to the operating system (OS) of the smart card control device and/or obfuscation of the MFK may be used to safeguard the MFK and/or the key components. However, such security techniques may be compromised based on the knowledge of the security techniques by an unauthorized entity.

In order to address the technical challenges related to security of key components and the MFK, a secure key component and PIN entry apparatus of a secure key component and PIN entry system, and method for secure key component and PIN entry are disclosed herein. According to examples, the system and method disclosed herein may include the secure key component and PIN entry apparatus, which may be used for secure key components and smart card PIN entry, for example, for storing key components onto smart cards, and loading of the key components from the smart cards onto the hardware security module for generating the MFK.

According to examples, the secure key component and PIN entry apparatus may provide for the secure entry of key components, for example, by preventing PINs, key components, and smart card key sets from existing in memory. A smart card keyset may be described as a key set that is used to form a secure channel between a smart card applet and the secure key component and PIN entry apparatus. The applet may be described as any type of application that performs a specific function, such as, for example, documentation, authentication, data storage such as storage of the key component, generation of a key component, and other such functions. The secure key component and PIN entry apparatus may be based on a protocol, such as, the Global Platform secure channel protocol 01 (SCP01), and other such protocols, and use 3×2 Triple DES (TDES) keys, and other such keys, to form a secure channel between the secure key component and PIN entry apparatus and a smart card applet on a smart card. TDES may represent symmetric-key block cipher, which applies the Data Encryption Standard (DES) cipher technique three times to each data block. In addition to a smart card key set used by the Global Platform SCP01 protocol, a triple-length TDES key may be embedded within the smart card applet, and the triple-length TDES key may be used to encrypt key components that are sent in the SCP01 secure channel. Thus, forming a secure channel between the smart card, and the secure key component and PIN entry apparatus may allow data to be transferred from the secure key component and PIN entry apparatus to the smart card securely (e.g., by entering a PIN on the secure key component and PIN entry apparatus, and then sending the PIN to the smart card for verification).

According to examples, the secure key component and PIN entry apparatus may include various security techniques for securing sensitive information, such as tamper proof seals, contacts, and/or stoppers to ensure that sensitive information is changed to zero in the event of an unauthorized access or tampering with the secure key component and PIN entry apparatus. Non-limiting examples of sensitive information may include key components, PINs, the TDES keyset, and other such information. The aspect of changing all sensitive information to zero may ensure the security of any key components as they are being entered into the secure key component and PIN entry apparatus, and the secrecy of the TDES keyset that is embedded in the smart card and the secure key component and PIN entry apparatus. Further, the security techniques as disclosed herein may also render the secure key component and PIN entry apparatus as no longer usable (e.g., for entry of PINs, key components, and/or smart card key sets).

With respect to the secure key component and PIN entry apparatus, since all functions involving key components for a smart card are performed in the secure key component and PIN entry apparatus, no sensitive information may maintained in persistent memory of the secure key component and PIN entry apparatus.

According to examples, the secure key component and PIN entry apparatus may be disposed between a smart card control device and a smart card, and include a slot in which the smart card may be inserted. In this regard, commands (e.g., commands to prompt certain transactions to start on the secure key component and PIN entry apparatus, such as PIN entry or key component entry) sent from the smart card control device to the smart card attached to the secure key component and PIN entry apparatus may pass through the secure key component and PIN entry apparatus. Therefore, for operations such as login, PIN change, and security administrator personalization, instead of entering the PIN and other needed information on the smart card control device, a user may directly enter such information according to prompts provided on the secure key component and PIN entry apparatus.

According to examples, with respect to a key component generation and entry process for the secure key component and PIN entry apparatus, as disclosed herein, a smart card control device may be connected with the secure key component and PIN entry apparatus. A smart card may be inserted into the secure key component and PIN entry apparatus. A user may log into the smart card using the secure key component and PIN entry apparatus. The secure key component and PIN entry apparatus may receive a communication (e.g., a command) from the smart card control device to generate or enter a key component. If the key component is to be generated, the secure key component and PIN entry apparatus may forward the command to the smart card, and the smart card may generate a key component and return the key component to the secure key component and PIN entry apparatus. If the key component is to be entered, the secure key component and PIN entry apparatus may prompt a user to enter the key component, and the user may then enter the key component. The secure key component and PIN entry apparatus may then wait for the user to confirm storing of the key component, and the secure key component and PIN entry apparatus may store the key component on the smart card upon receiving confirmation from the user.

Figure 1:
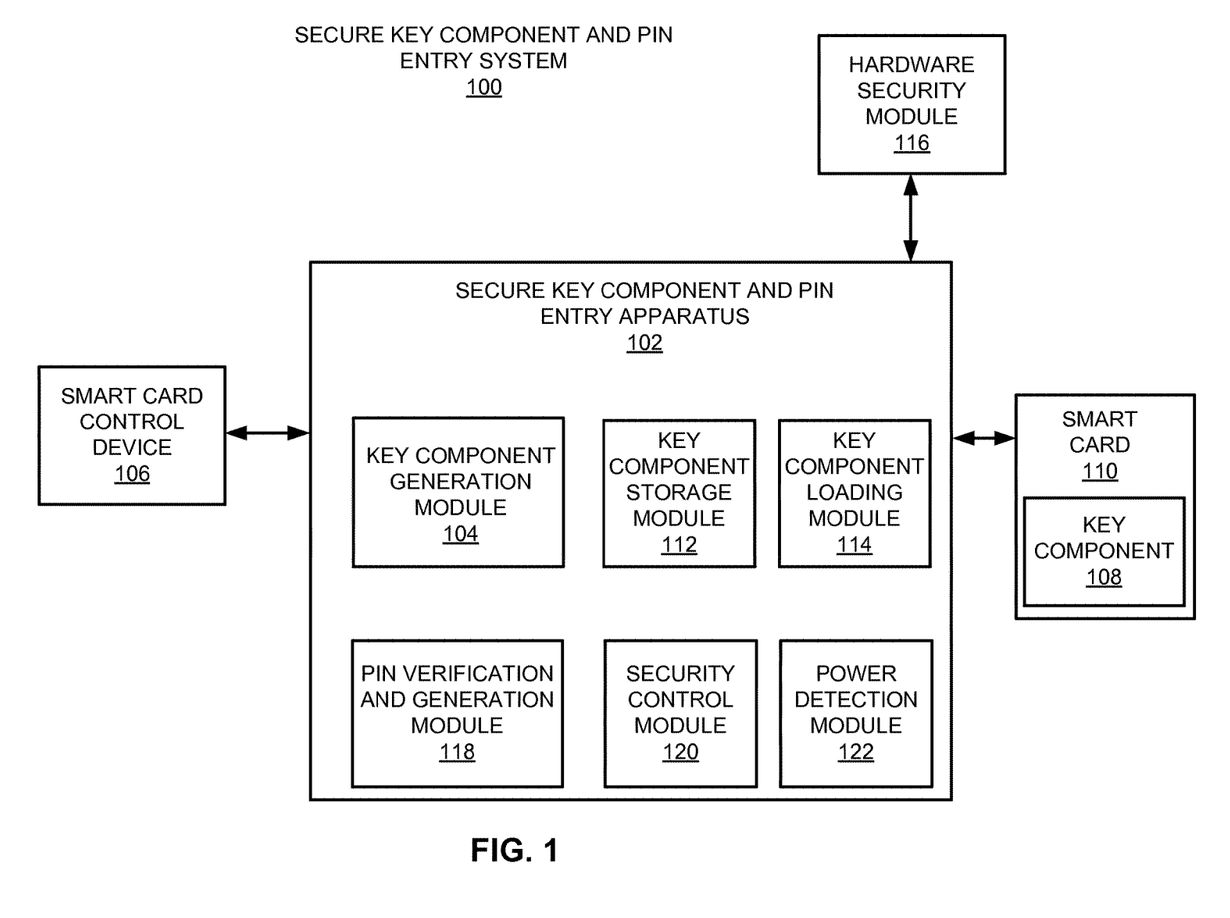
FIG. 1 illustrates an architecture of a secure key component and PIN entry system, according to an example of the present disclosure.

FIG. 1 illustrates an architecture of a secure key component and PIN entry system (hereinafter also referred to as "system 100"), according to an example of the present disclosure. Referring to FIG. 1, the system 100 is depicted as including a secure key component and PIN entry apparatus 102 to receive (i.e., by a key component generation module 104) a communication (e.g., a command or a request) from a smart card control device 106 upon connection (e.g., via a Universal Serial Bus (USB), or another type of connection) of the smart card control device 106 with the apparatus 102. The communication may be related to storage of a key component 108 on a smart card 110 that is communicatively connectable to the apparatus 102. The key component 108 may be related to a MFK that is formed by using a plurality of key components including the key component 108.

In response to the communication, the key component generation module 104 may prompt the smart card 110 to generate the key component 108 or receive entry of the key component 108 based on actuation of buttons 202 (see FIG. 2) of a keypad (200 see FIG. 2) of the apparatus 102.

A key component storage module 112 may store the generated or received key component 108 on the smart card 110 upon connection of the smart card 110 with the apparatus 102. According to examples, the key component 108 may be related to the MFK that is formed by applying an XOR operation to the plurality of key components.

A key component loading module 114 may load the key component 108 from the smart card 110 onto a hardware security module 116 for generating the MFK.

A PIN verification and generation module 118 may generate a prompt to enter a PIN prior to generation of the key component 108, or receiving of the entry of the key component 108 based on the actuation of the buttons related to the key component 108. The PIN verification and generation module 118 may verify the PIN to determine whether a user of the apparatus 102 is an authorized user. In response to a determination that the user of the apparatus 102 is the authorized user, the key component generation module 104 may prompt the smart card 110 to generate the key component 108, or receive entry of the key component 108 based on the actuation of the buttons related to the key component 108.

A security control module 120 may determine (e.g., by monitoring) whether a contact part (of a contact 800 as described with reference to FIG. 8) disposed on a first panel (e.g., front or back panel 702 or 704 as described with reference to FIG. 7) of the apparatus 102 is disposed in an engaged (e.g., contiguously aligned) or a disengaged (e.g., separated) position relative to another contact part (of the corresponding contact 800 as described with reference to FIG. 8) disposed on a second panel (e.g., another one of the front or the back panel 702 or 704 as described with reference to FIG. 7) of the apparatus 102. In response to a determination that the contact part disposed on the first panel of the apparatus 102 is disposed in the disengaged position relative to the another contact part disposed on the second panel of the apparatus 102, the security control module 120 may change predetermined information (e.g., sensitive information) on the apparatus 102 to a predetermined value (e.g., zero, or a user-defined value).

A power detection module 122 may monitor a power status of the apparatus 102. For example, if the available power from a battery of the apparatus 102 falls below an apparatus sleep threshold, further processing related to the apparatus 102 may be discontinued to preserve power for operation of other modules, such as the security control module 120. Further, if the available power from the battery of the apparatus 102 falls below a security operation threshold that is lower than the apparatus sleep threshold, sensitive information on the apparatus 102 may be changed to zero by the security control module 120.

Figure 2:
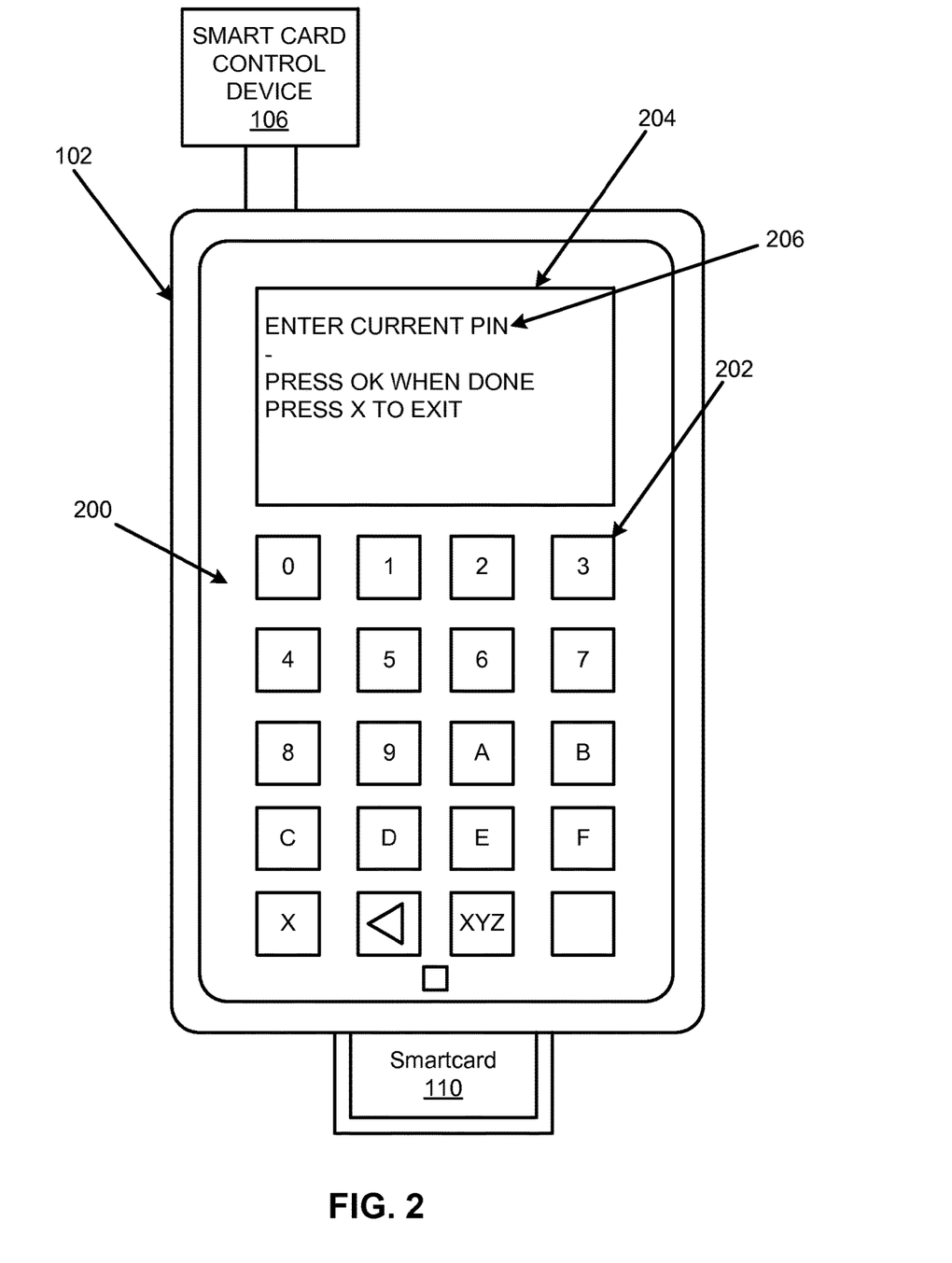
FIG. 2 illustrates PIN verification for a secure key component and PIN entry apparatus of the secure key component and PIN entry system of FIG. 1, according to an example of the present disclosure.

FIG. 2 illustrates PIN verification for the apparatus 102 of the secure key component and PIN entry system 100, according to an example of the present disclosure.

Referring to FIG. 2, the keypad 200 of the apparatus 102 may include the buttons 202 that include the numbers 0-9, and the letters A-F for key component entry in hexadecimal notation. For example, the buttons 202 may be used to enter a 32 byte symmetric key component with values 0-FF (e.g., see key components 600 of FIG. 6). The buttons may be manually depressed by a user of the apparatus 102, or otherwise, provided in a digital format for display on an enlarged screen such as the screen for the user-interface display 204.

With respect to changing of a PIN, a user of the apparatus 102 may enter a current PIN directly in the apparatus 102 as shown at 206 for the user-interface display 204.

Figure 3:
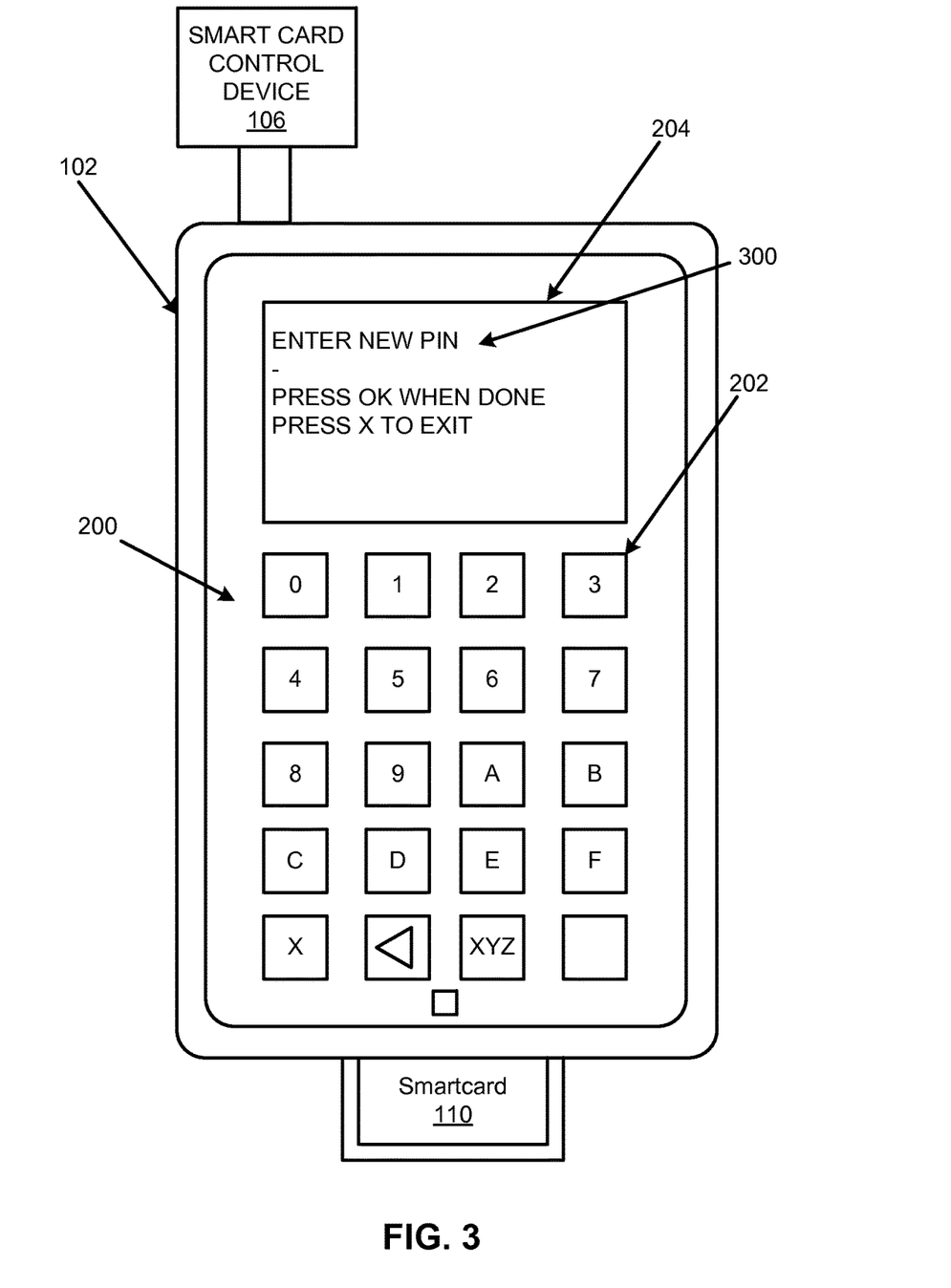
FIG. 3 illustrates new PIN entry for the secure key component and PIN entry apparatus of the secure key component and PIN entry system of FIG. 1, according to an example of the present disclosure.

FIG. 3 illustrates new PIN entry for the apparatus 102 of the secure key component and PIN entry system 100, according to an example of the present disclosure.

With respect to changing of a PIN, further to the entry of the current PIN directly in the apparatus 102 as shown at 206 for the user-interface display 204 of FIG. 2, as shown at 300 in FIG. 3, the user may enter a new PIN directly in the apparatus 102.

Figure 4:
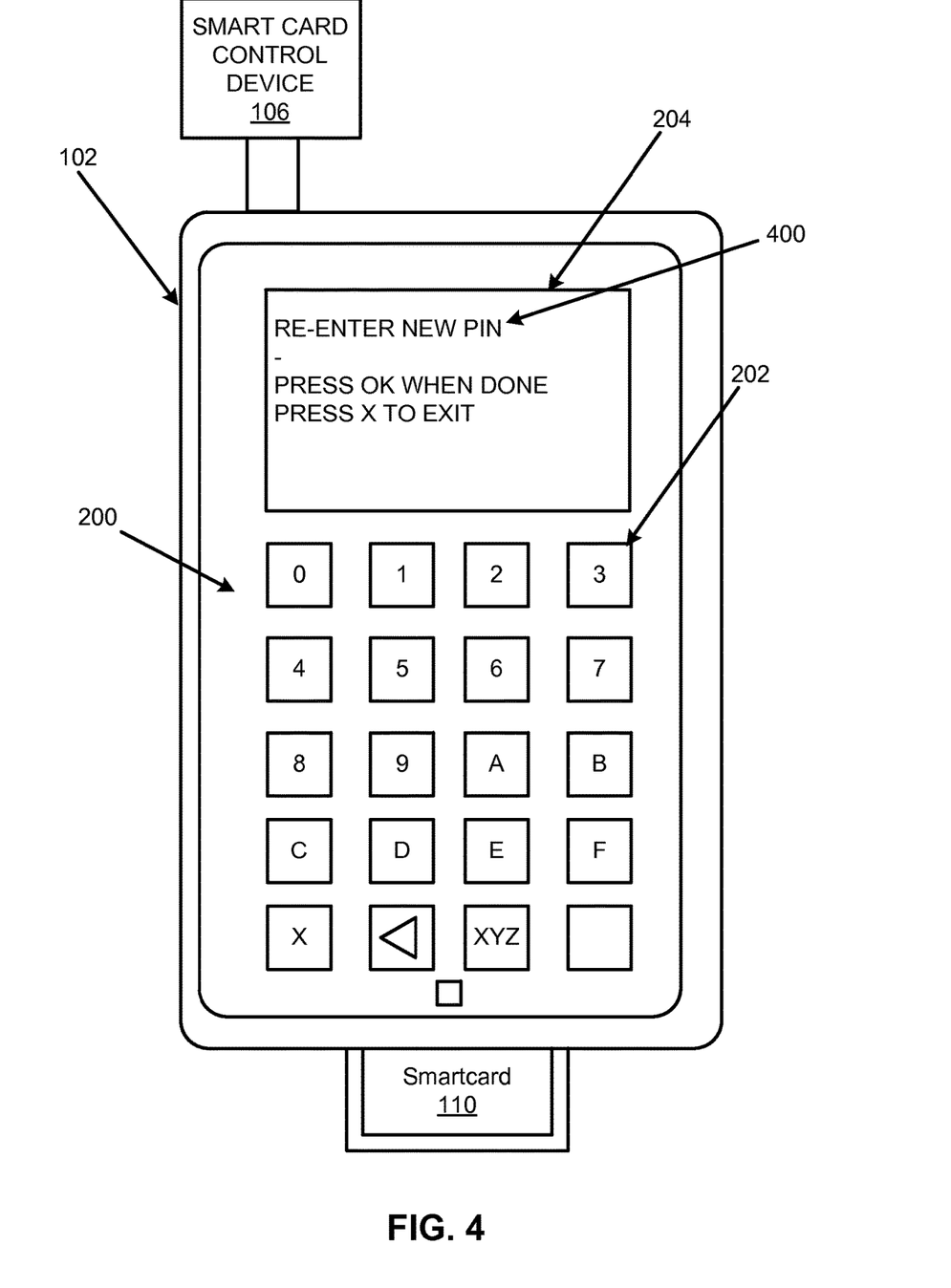
FIG. 4 illustrates new PIN verification for the secure key component and PIN entry apparatus of the secure key component and PIN entry system of FIG. 1, according to an example of the present disclosure.

FIG. 4 illustrates new PIN verification for the apparatus 102 of the secure key component and PIN entry system 100, according to an example of the present disclosure.

With respect to changing of a PIN, further to the entry of the new PIN directly in the apparatus 102 as shown at 300 for the user-interface display 204 of FIG. 3, as shown at 400 in FIG. 4, the user may verify the new PIN directly in the apparatus 102.

Figure 5:
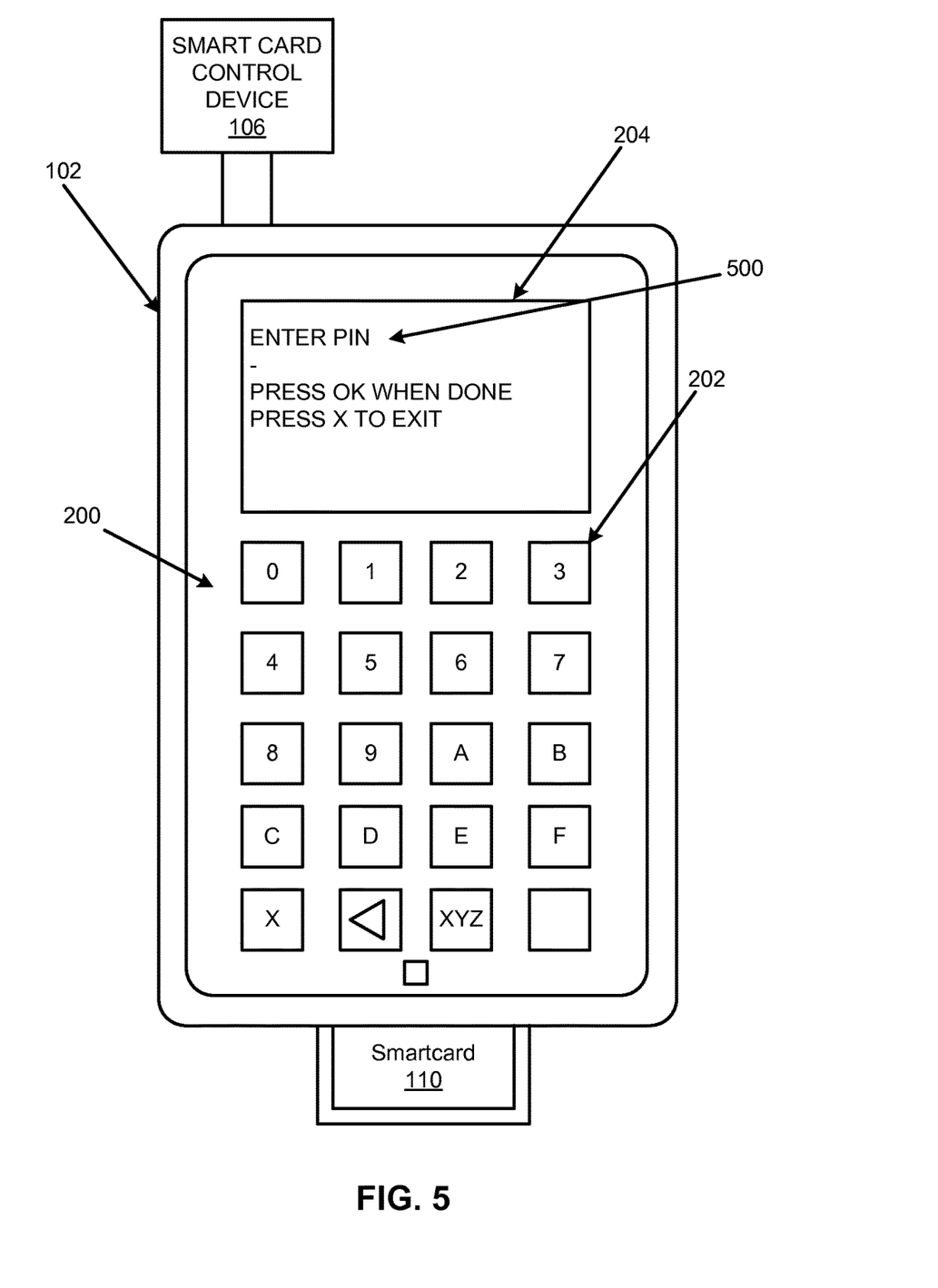
FIG. 5 illustrates a login screen for the secure key component and PIN entry apparatus of the secure key component and PIN entry system of FIG. 1, according to an example of the present disclosure.

FIG. 5 illustrates a login screen for the apparatus 102 of the secure key component and PIN entry system 100, according to an example of the present disclosure.

Referring to FIG. 5, in order to enter or generate the key component 108, as shown at 500 for the user-interface display 204, a user may enter a PIN directly in the apparatus 102.

Figure 6:
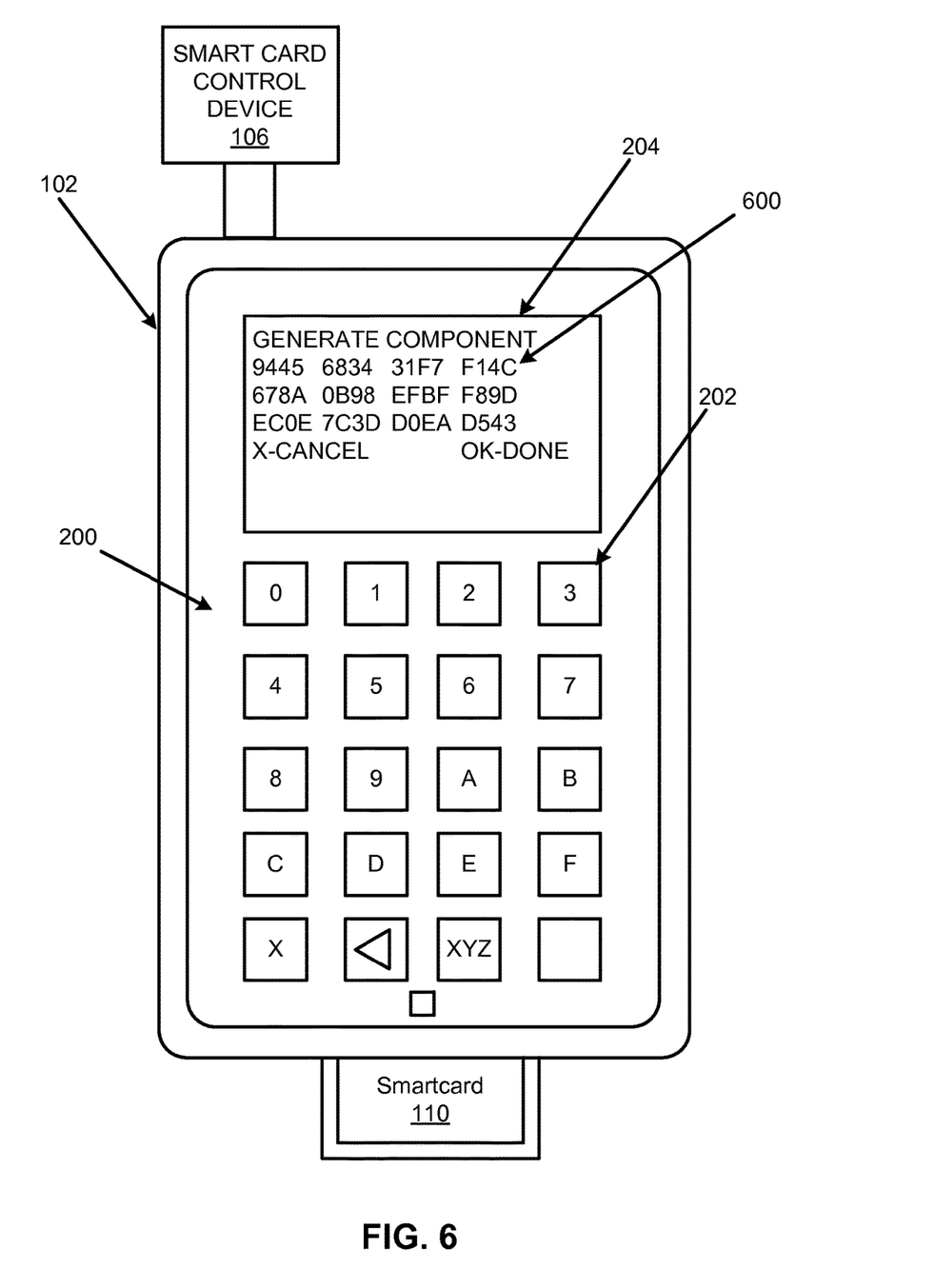
FIG. 6 illustrates key component entry for the secure key component and PIN entry apparatus of the secure key component and PIN entry system of FIG. 1, according to an example of the present disclosure.

FIG. 6 illustrates key component entry for the apparatus 102 of the secure key component and PIN entry system 100, according to an example of the present disclosure.

Referring to FIG. 6, in order to enter the key component 108, the user may enter the key component 108 by using the keypad 200 by using the buttons 202 that include the numbers 0-9, and the letters A-F for key component entry in hexadecimal notation. In this regard, the user may use the apparatus 102 to directly enter the key component 108, where the apparatus 102 provides for the secure entry of key components, for example, by preventing the key components from existing in memory.

Referring to FIG. 6, in order to generate the key component 108, the key component generation module 104 of the apparatus 102 may prompt the smart card 110 to generate the key component 108, and the generated key component 108 may be displayed as shown at 600 for the user-interface display 204 along with an option to either retain or discard the key component 108.

In both cases, the check digits of the key component 108 may be sent from the apparatus 102 to the smart card control device 106. The check digits may represent the first four (or six) digits of a cryptogram generated by encrypting an all 0 data block using a specific key. The check digits may be used to uniquely identify a key without giving that key away. The check digits may be sent to the smart card control device 106 so that a user may distinguish between different keys.

A user may also select a size of the key component 108 by using one of the buttons 202 corresponding to the appropriate size. For example, a size of the key component 108 may be selected as 8 bytes, 16 bytes, etc.

The key component generation module 104 may determine a cryptogram and challenge/response components function such that random data or entered data may be used for challenges. With respect to determination of the cryptogram, a user may manually enter the key component 108 by using the keypad 200 that includes buttons 202 that include the numbers 0-9, and the letters A-F for key component entry in hexadecimal notation. Alternatively or additionally, the key component generation module 104 may prompt the user to approve a request to prompt the smart card 110 to generate the key component 108.

With respect to the determination of the cryptogram and challenge/response, the key component generation module 104 may also provide a user of the apparatus 102 with an option to determine a size of the cryptogram and challenge/response. In this regard, the key component generation module 104 may provide an option to select a header that is to be used for the transition, where the header may provide additional details for a command. Similar to entering a key component, the key component generation module 104 may provide the option to generate or input, and perform the corresponding actions on the apparatus 102. In this regard, at least a second smart card may be needed to repeat this process. The second smart card may be needed for a transaction because these commands may need dual control, that is, need two users to verify the transaction.

With respect to key component entry, according to examples, the key components may be two key or three key TDES (i.e., two lines, or as shown in FIG. 6 at 600, three lines of data).

Figure 7:
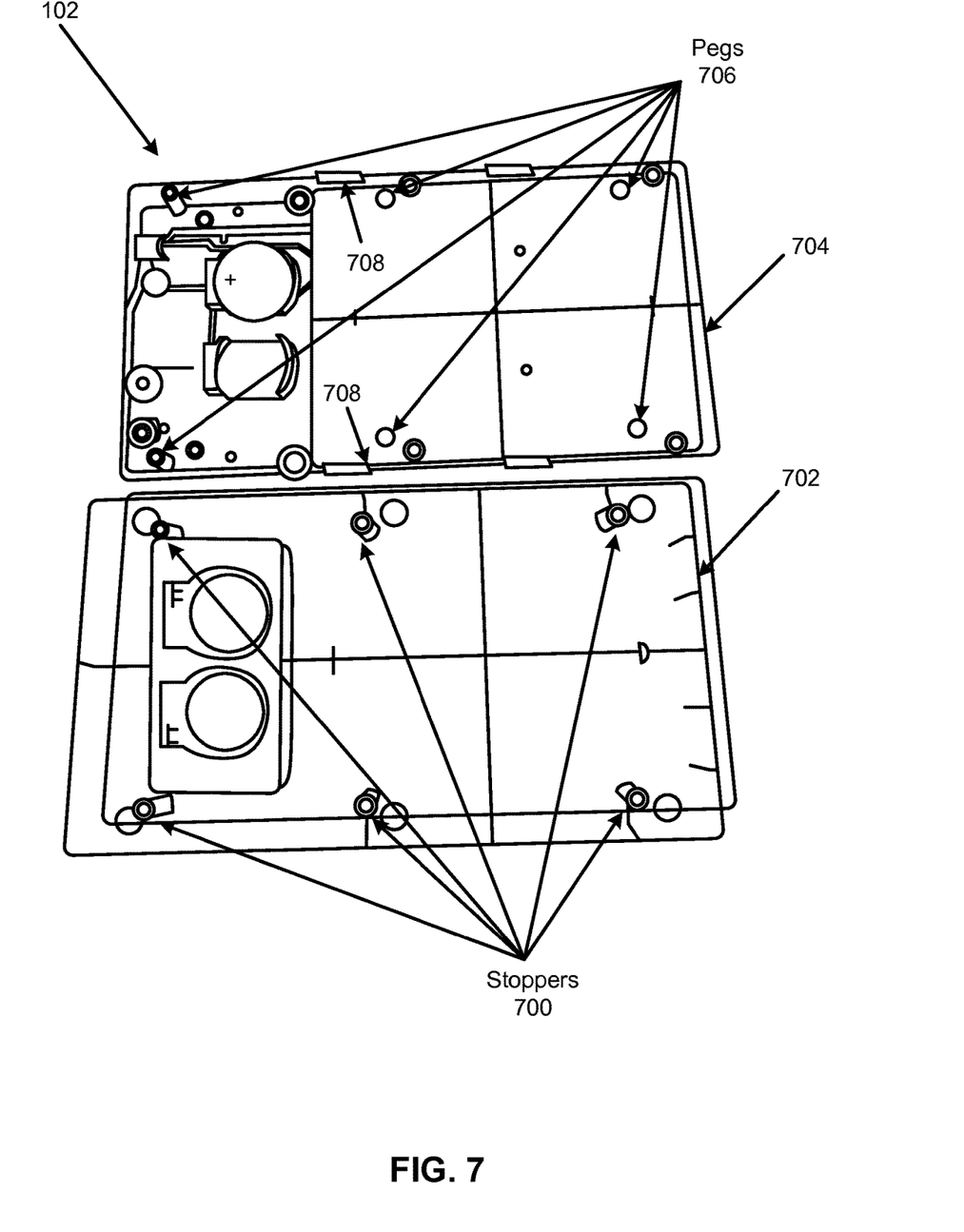
FIG. 7 illustrates stoppers for the secure key component and PIN entry apparatus of the secure key component and PIN entry system of FIG. 1, according to an example of the present disclosure.

FIG. 7 illustrates stoppers for the apparatus 102 of the secure key component and PIN entry system 100, according to an example of the present disclosure.

Referring to FIG. 7, stoppers 700 may disposed on a front panel 702 or a back panel 704 of the apparatus 102. The stoppers 700 may each include corresponding pegs 706, which are disposed on the other one of the front panel 702 or the back panel 704.

According to examples, the stoppers 700 may be formed of rubber, or other such elastic materials. In this regard, when screws, clips, or other such devices that are used to securely join the front panel 702 to the back panel 704 are loosened or removed, the elasticity of the stoppers 700 may effectively push the front panel 702 away from the back panel 704, and disengage contacts 800 as disclosed herein with respect to FIG. 8.

According to examples, the stoppers 700 may be provided in a removable configuration, where removal of a stopper (e.g., inadvertent removal due to tampering with the apparatus 102) may change an alignment of the front panel 702 relative to the back panel 704. Further, alternation of the alignment of the front panel 702 relative to the back panel 704 may result in sensitive information on the apparatus 102 being changed to zero by the security control module 120 as disclosed herein.

The apparatus 102 may also include tamper proof seals 708 on the mating surfaces of the front panel 702 and the back panel 704 to provide a visual indication of any attempt to tamper with the apparatus 102. For example, the tamper proof seals may be formed of plastic, metal, or other such materials. The tamper proof seals may be glued or otherwise attached to the front panel 702 and the back panel 704 such that the mating edges of the front panel 702 and the back panel 704 are disposed generally centrally to the tamper proof seals 708.

Figure 8:
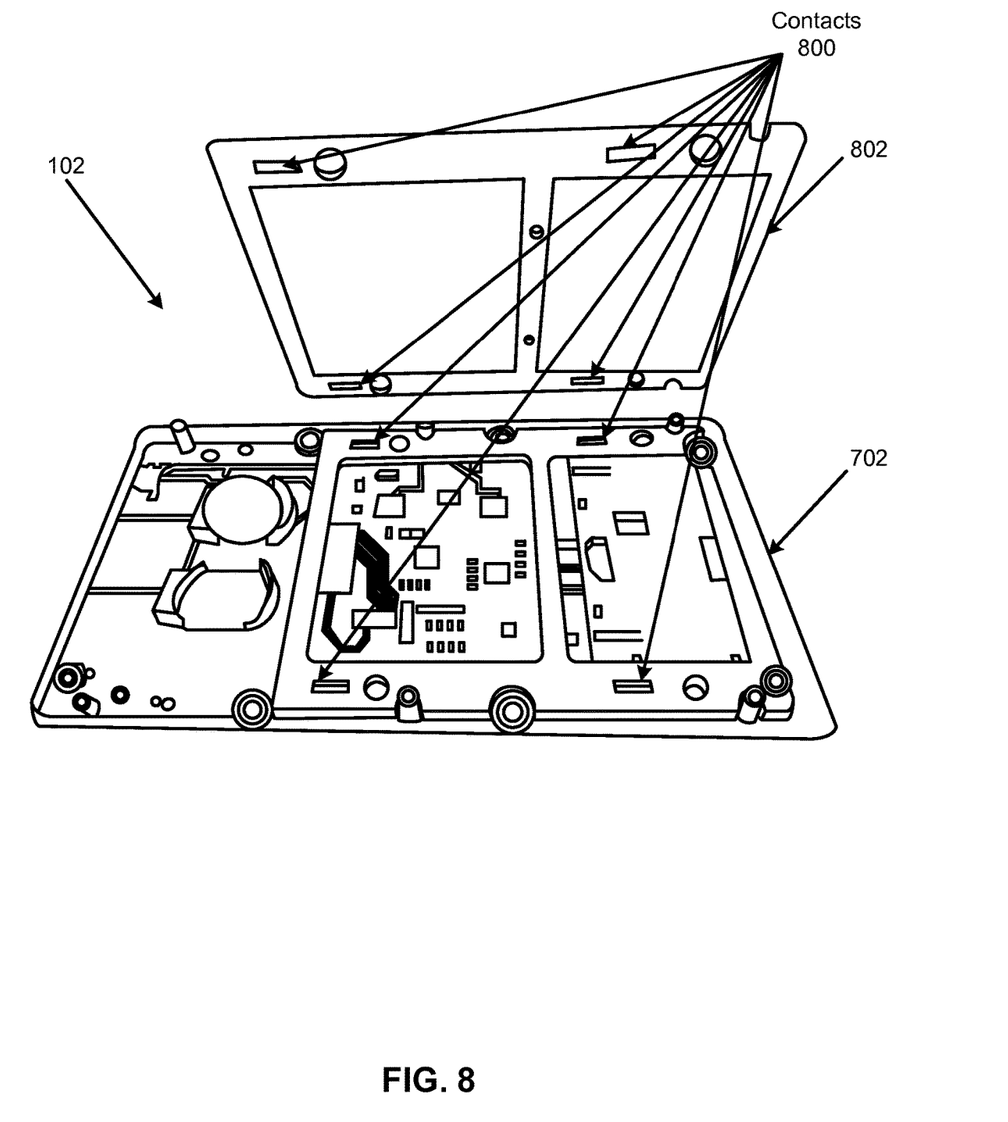
FIG. 8 illustrates contacts for the secure key component and PIN entry apparatus of the secure key component and PIN entry system of FIG. 1, according to an example of the present disclosure.

FIG. 8 illustrates contacts for the apparatus 102 of the secure key component and PIN entry system 100, according to an example of the present disclosure.

Referring to FIG. 8, the apparatus 102 may include the contacts 800 to ensure that all sensitive information is changed to zero by the security control module 120 in the event of an attack. The aspect of changing all sensitive information to zero may ensure the security of any key components as they are being entered into the apparatus 102, and the secrecy of the TDES keyset that is embedded in the apparatus 102.

The contacts 800 may include, for example, a first contact set disposed on an inner surface of an inner panel 802 for contiguous engagement with a second contact set disposed on an inner surface of the front panel 702. The contacts 800 may include electrical, magnetic, or other such contacts that may operate as another measure of security for the apparatus 102. Disengagement of the contacts 800 (e.g., based on separation of the inner panel 802 from the front panel 702) may result in sensitive information on the apparatus 102 being changed to zero by the security control module 120.

The modules and other elements of the apparatus 102 may be machine readable instructions stored on a non-transitory computer readable medium. In this regard, the apparatus 102 may include a non-transitory computer readable medium. In addition, or alternatively, the modules and other elements of the apparatus 102 may be hardware or a combination of machine readable instructions and hardware.

Figure 9:
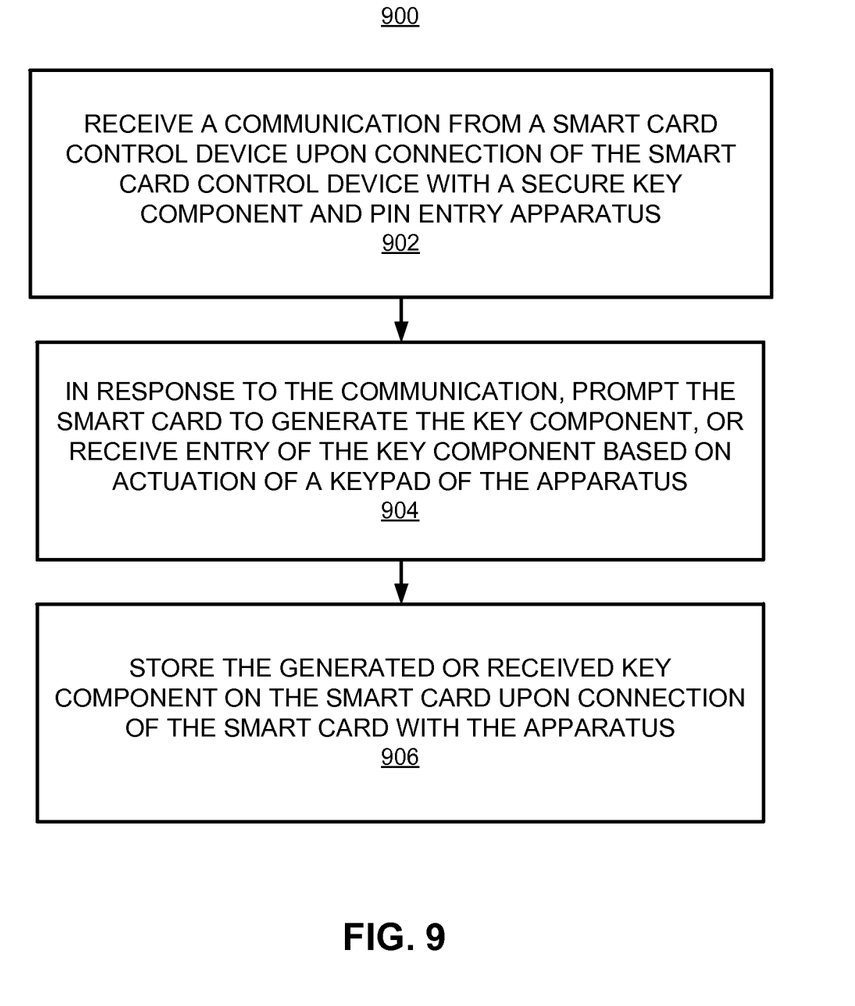
FIG. 9 illustrates a flowchart of a method for secure key component and PIN entry, according to an example of the present disclosure.
Figure 10:
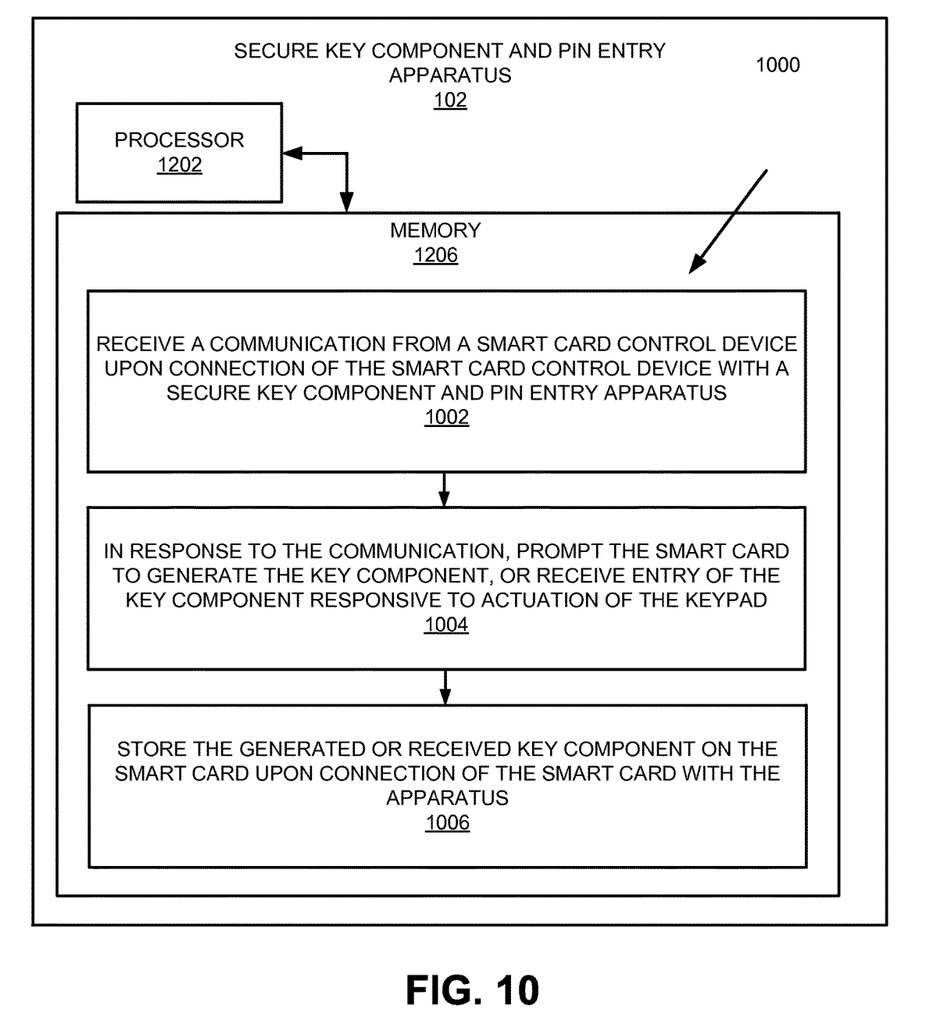
FIG. 10 illustrates a flowchart of a method for secure key component and PIN entry, according to an example of the present disclosure.
Figure 11:
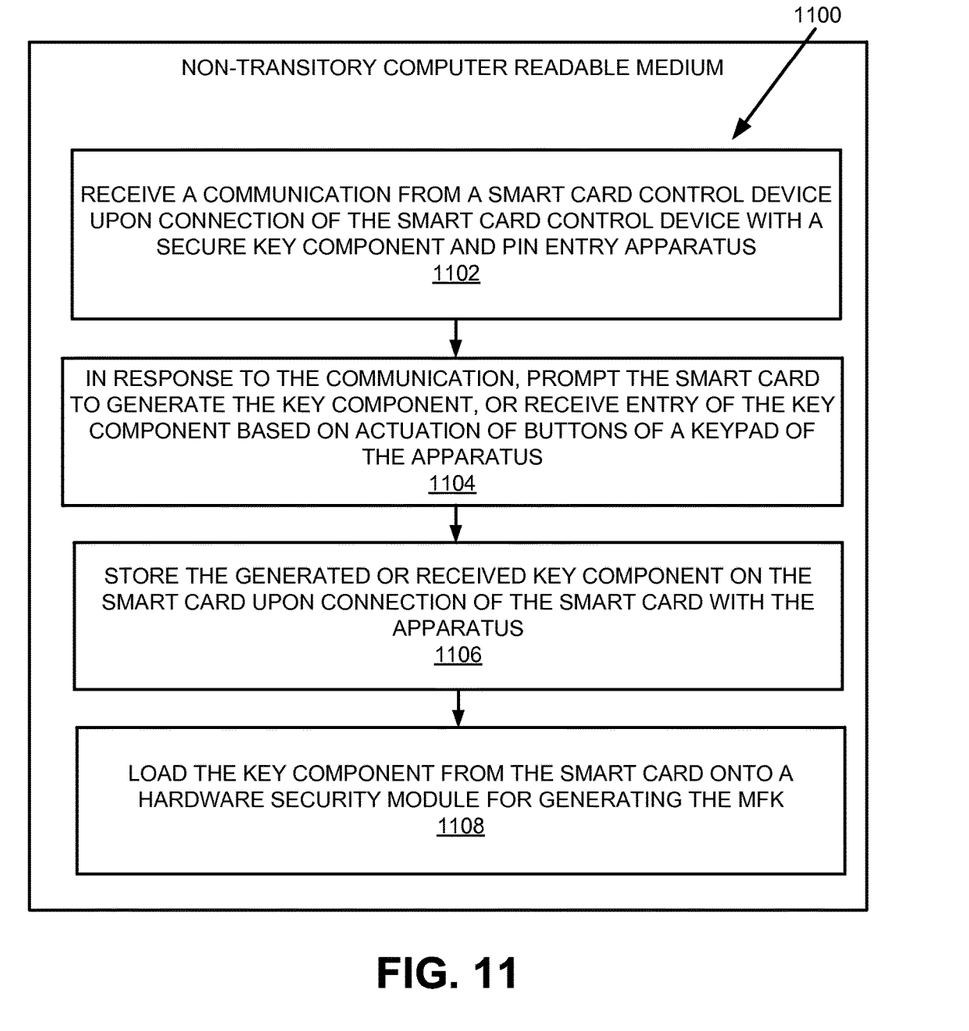
FIG. 11 illustrates a flowchart of a method for secure key component and PIN entry, according to an example of the present disclosure.

FIGS. 9-11 respectively illustrate flowcharts of methods 900, 1000, and 1100 for secure key component and PIN entry, corresponding to the example of the secure key component and PIN entry apparatus 102 whose construction is described in detail above. The methods 900, 1000, and 1100 may be implemented on the secure key component and PIN entry apparatus 102 with reference to FIGS. 1-8 by way of example and not limitation. The methods 900, 1000, and 1100 may be practiced in other systems.

Further, although execution of the methods described herein is with reference to the system 100 of FIG. 1, other suitable devices for execution of these methods will be apparent to those of skill in the art. The methods described in the flowcharts of FIG. 9-11 may be implemented in the form of executable instructions stored on a machine-readable storage medium, such as the memory 1206 and/or the secondary data storage 1208 of FIG. 12, by one or more modules described herein, and/or in the form of electronic circuitry.

Referring to FIG. 9, for the method 900, at block 902, the method may include receiving, by a secure key component and PIN entry apparatus 102 comprising a physical processor (e.g., the physical processor 1202 of FIG. 12), a communication from a smart card control device 106 upon connection of the smart card control device 106 with the apparatus 102. The communication may be related to storage of a key component 108 on a smart card 110 that is communicatively connectable to the apparatus 102, and the key component 108 may be related to a MFK that is formed by using a plurality of key components including the key component 108.

At block 904, the method 900 may include prompting, by the apparatus 102 comprising the physical processor, the smart card 110 to generate the key component 108, or receiving, by the apparatus 102 comprising the physical processor, entry of the key component 108 based on actuation of a keypad 200 of the apparatus 102.

At block 906, the method 900 may include storing, by the apparatus 102 comprising the physical processor, the generated or received key component 108 on the smart card 110 upon connection of the smart card 110 with the apparatus 102.

According to examples, for the method 900, the key component 108 may be related to the MFK that is formed by applying an XOR operation to the plurality of key components.

According to examples, the method 900 may include loading, by the apparatus 102 comprising the physical processor, the key component 108 from the smart card 110 onto a hardware security module 116 for generating the MFK.

According to examples, the method 900 may include determining, by the apparatus 102 comprising the physical processor, a status of the apparatus 102 as being secure or insecure, and in response to a determination that the status of the apparatus 102 is insecure, changing, by the apparatus 102 comprising the physical processor, predetermined information on the apparatus 102 to a predetermined value.

According to examples, the method 900 may include determining, by the apparatus 102 comprising the physical processor, the status of the apparatus 102 as being secure or insecure by determining whether a contact part (see FIG. 8) disposed on a first panel of the apparatus 102 is disposed in an engaged or a disengaged position relative to another contact part disposed on a second panel of the apparatus 102, and in response to a determination that the contact part disposed on the first panel of the apparatus 102 is disposed in the disengaged position relative to the another contact part disposed on the second panel of the apparatus 102, changing, by the apparatus 102 comprising the physical processor, the predetermined information on the apparatus 102 to the predetermined value.

According to examples, the method 900 may include determining, by the apparatus 102 comprising the physical processor, whether a power status of the apparatus 102 is below a predetermined threshold, and in response to a determination that the power status of the apparatus 102 is below the predetermined threshold, changing, by the apparatus 102 comprising the physical processor, predetermined information on the apparatus 102 to a predetermined value.

According to examples, for the method 900, the predetermined value may be zero.

Referring to FIG. 10, for the method 1000, at block 1002, the method may include receiving a communication from a smart card control device 106 upon connection of the smart card control device 106 with the apparatus 102. The communication may be related to storage of a key component 108 on a smart card 110 communicatively connectable to the apparatus 102, and the key component 108 may be related to a MFK that is formed by using a plurality of key components including the key component 108.

At block 1004, the method 1000 may include in response to the communication, prompting the smart card 110 to generate the key component 108, or receive entry of the key component 108 responsive to actuation of a keypad 200 facilitating selection of numbers 0-9, and letters A-F for key component 108 entry in hexadecimal notation.

At block 1006, the method 1000 may include storing the generated or received key component 108 on the smart card 110 upon connection of the smart card 110 with the apparatus 102.

According to examples, the method 1000 may include providing a tamper proof seal on first and second panels of the apparatus 102, where the tamper proof seal is removable and/or breakable to provide a visual indication of tampering with the apparatus 102.

Referring to FIG. 11, for the method 1100, at block 1102, the method may include receiving a communication from a smart card control device 106 upon connection of the smart card control device 106 with the apparatus 102. The communication may be related to storage of a key component 108 on a smart card 110 that is communicatively connectable to the apparatus 102, and the key component 108 may be related to a MFK that is formed by using a plurality of key components including the key component 108.

At block 1104, the method may include in response to the communication, prompting the smart card 110 to generate the key component 108, or receive entry of the key component 108 based on actuation of buttons 202 of a keypad 200 of the apparatus 102.

At block 1106, the method may include storing the generated or received key component 108 on the smart card 110 upon connection of the smart card 110 with the apparatus 102.

At block 1108, the method may include loading the key component 108 from the smart card 110 onto a hardware security module 116 for generating the MFK.

According to examples, the method 1100 may include generating a prompt to enter a PIN prior to generation of the key component 108, or receiving of the entry of the key component 108 based on the actuation of the buttons 202 related to the key component 108, and verifying the PIN to determine whether a user of the apparatus 102 is an authorized user. Further, in response to a determination that the user of the apparatus 102 is the authorized user, the method 1100 may include prompting the smart card 110 to generate the key component 108, or receive entry of the key component 108 based on the actuation of the buttons 202 related to the key component 108.

Figure 12:
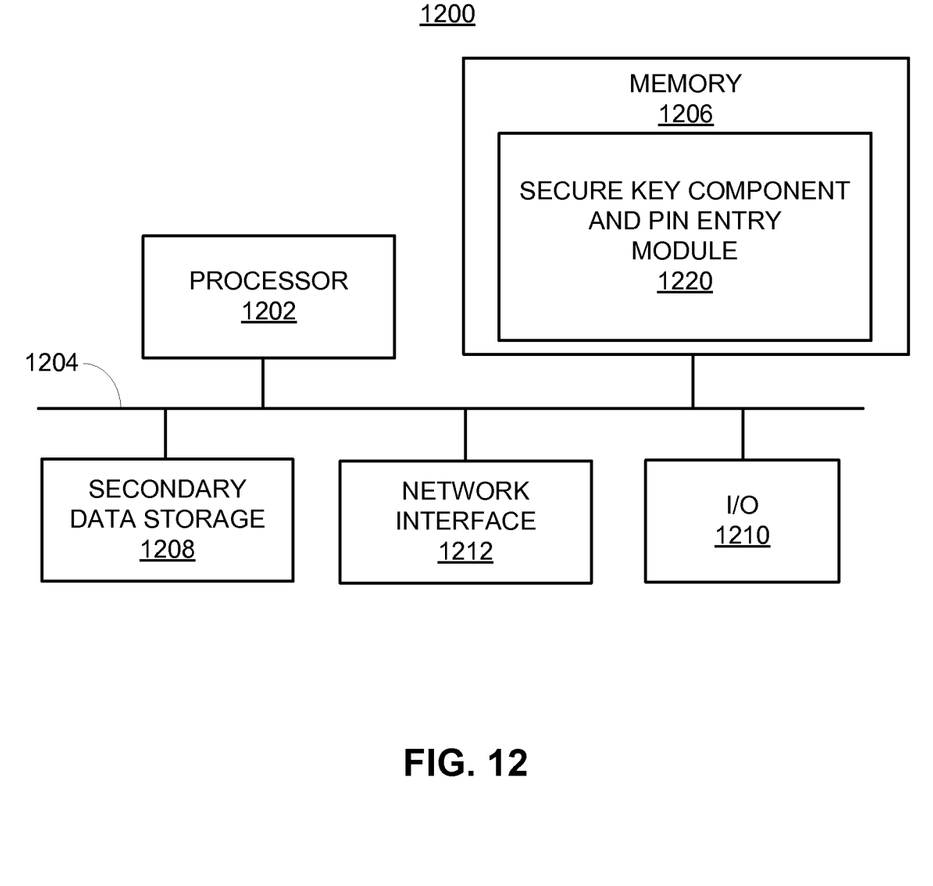
FIG. 12 illustrates a computer system, according to an example of the present disclosure.

FIG. 12 shows a computer system 1200 that may be used with the examples described herein. The computer system 1200 may represent a generic platform that includes components that may be in a server or another computer system. The computer system 1200 may be used as a platform for the system 100. The computer system 1200 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1200 may include a processor 1202 that may implement or execute machine readable instructions performing some or all of the methods, functions and other processes described herein. Commands and data from the processor 1202 may be communicated over a communication bus 1204. The computer system may also include a main memory 1206, such as a random access memory (RAM), where the machine readable instructions and data for the processor 1202 may reside during runtime, and a secondary data storage 1208, which may be non-volatile and stores machine readable instructions and data. The memory and data storage are examples of computer readable mediums. The memory 1206 may include a secure key component and PIN entry module 1220 including machine readable instructions residing in the memory 1206 during runtime and executed by the processor 1202. The secure key component and PIN entry module 1220 may include the modules of the apparatus 102 shown in FIG. 1.

The computer system 1200 may include an I/O device 1210, such as a keyboard, a mouse, a display, etc. The computer system may include a network interface 1212 for connecting to a network. Other known electronic components may be added or substituted in the computer system.

The foregoing disclosure describes a number of examples for secure key component and PIN entry. The disclosed examples may include systems, devices, computer-readable storage media, and methods for secure key component and PIN entry. For purposes of explanation, certain examples are described with reference to the components illustrated in FIGS. 1-12. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-12 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A method comprising:
receiving, by a user input apparatus comprising a physical processor, a communication from a smart card control device upon connection of the smart card control device with the user input apparatus, wherein the communication comprises a command to generate a key component on a smart card that is communicatively connected via an encrypted channel to the user input apparatus, wherein the key component is one of a plurality of key components to be used to form a Master File Key (MFK), the plurality of key components to be stored in a plurality of smart cards;

in response to a receipt of the communication from the smart card control device, the user input apparatus sending to the smart card, via the encrypted channel, an encrypted command to generate the key component on the smart card; and in response to receiving the encrypted command from the user input apparatus via the encrypted channel, the smart card generating the key component to be stored in the smart card.

2. The method according to claim 1, further comprising forming the Master File Key by applying an XOR operation to the plurality of key components stored in the plurality of smart cards.

3. The method according to claim 1, further comprising:
storing, by the user input apparatus, encrypted channel information; and
using, by the user input apparatus, the stored encrypted channel information to establish the encrypted channel with the smart card.

4. The method according to claim 3, further comprising:
determining, by the user input apparatus, a status of the user input apparatus as being secure or insecure; and
in response to a determination that the status of the user input apparatus is insecure, changing, by the user input apparatus the encrypted channel information on the user input apparatus to a user-defined value not equal to zero.

5. The method according to claim 4, wherein determining, by the user input apparatus, the status of the user input apparatus as being secure or insecure further comprises:
determining whether a contact part disposed on a first panel of the user input apparatus is disposed in an engaged or a disengaged position relative to another contact part disposed on a second panel of the user input apparatus; and
in response to a determination that the contact part disposed on the first panel of the user input apparatus is disposed in the disengaged position relative to the another contact part disposed on the second panel of the user input apparatus, changing, by the user input apparatus, the encrypted channel information on the user input apparatus to the user-defined value.

6. The method according to claim 3, further comprising:
determining, by the user input apparatus, whether a power status of the user input apparatus is below a predetermined threshold; and
in response to a determination that the power status of the user input apparatus is below the predetermined threshold, changing, by the user input apparatus, the encrypted channel information on the user input apparatus to a user-defined value not equal to zero.

7. The method according to claim 3, further comprising:
determining whether a front panel of the user input apparatus is in alignment with a back panel of the user input apparatus; and
in response to a determination that the front panel of the user input apparatus is not in alignment with the back panel of the user input apparatus, changing, by the user input apparatus, the encrypted channel information on the user input apparatus to zero.

8. A user input apparatus comprising:
a keypad for selection of numbers 0-9, and letters A-F for key component entry in hexadecimal notation;
at least one physical processor; and a memory storing machine readable instructions that when executed by the at least one physical processor cause the at least one physical processor to:
receive a communication from a smart card control device upon connection of the smart card control device with the user input apparatus, wherein the communication comprises a command to generate a key component on a smart card communicatively connected via an encrypted channel to the user input apparatus, wherein the key component is one of a plurality of key components to be used to form a Master File Key (MFK), the plurality of key components to be stored in a plurality of smart cards;
in response to a receipt of the communication from the smart card control device, send to the smart card, via the encrypted channel, an encrypted command to generate the key component, the smart card to generate and store the key component responsive to the encrypted command received from the user input apparatus via the encrypted channel.

9. The user input apparatus according to claim 8, further comprising a tamper proof seal on first and second panels of the user input apparatus, wherein the tamper proof seal is at least one of removable and breakable to provide a visual indication of tampering with the user input apparatus.

10. The user input apparatus according to claim 8, further comprising machine readable instructions that when executed by the at least one physical processor further cause the at least one physical processor to:
store encrypted channel information; and
use the stored encrypted channel information to establish the encrypted channel with the smart card.

11. The user input apparatus according to claim 10, further comprising machine readable instructions that when executed by the at least one physical processor further cause the at least one physical processor to:
determine whether a contact part disposed on a first panel of the user input apparatus is disposed in an engaged or a disengaged position relative to another contact part disposed on a second panel of the user input apparatus; and
in response to a determination that the contact part disposed on the first panel of the user input apparatus is disposed in the disengaged position relative to the another contact part disposed on the second panel of the user input apparatus, change the encrypted channel information on the user input apparatus to a user-defined value not equal to zero.

12. The user input apparatus according to claim 10, further comprising machine readable instructions that when executed by the at least one physical processor further cause the at least one physical processor to:
determine whether a power status of the user input apparatus is below a predetermined threshold; and
in response to a determination that the power status of the user input apparatus is below the predetermined threshold, change the encrypted channel information on the user input apparatus to a user-defined value not equal to zero.

13. The user input apparatus according to claim 8, further comprising machine readable instructions that when executed by the at least one physical processor further cause the at least one physical processor to:
determine whether a front panel of the user input apparatus is in alignment with a back panel of the user input apparatus; and in response to a determination that the front panel of the user input apparatus is not in alignment with the back panel of the user input apparatus, change the encrypted channel information on the user input apparatus to zero.

14. The user input apparatus according to claim 8, further comprising machine readable instructions that when executed by the at least one physical processor further cause the at least one physical processor to:

access the plurality of key components from the plurality of smart cards; and generate the Master File Key using the plurality of key components.

15. A non-transitory computer readable medium having stored thereon machine readable instructions, the machine readable instructions, when executed, cause at least one physical processor of a user input apparatus to:

receive, by the user input apparatus, a communication from a smart card control device upon connection of the smart card control device with the user input apparatus, wherein the communication comprises a command to generate a key component on a smart card that is communicatively connected via an encrypted channel to the user input apparatus, wherein the key component is one of a plurality of key components to be used to form a Master File Key (MFK), the plurality of key components to be stored in a plurality of smart cards;

in response to a receipt of the communication from the smart card control device, send to the smart card, via the encrypted channel, an encrypted command to generate the key component, the smart card to generate and store the key component responsive to the encrypted command received from the user input apparatus via the encrypted channel.

16. The non-transitory computer readable medium according to claim 15, further comprising machine readable instructions, when executed, further cause the at least one physical processor of the user input apparatus to:

generate a prompt to enter a PIN prior to a transmission of the encrypted command to the smart card via the encrypted channel;

verify the PIN to determine whether a user of the user input apparatus is an authorized user; and in response to a determination that the user of the user input apparatus is the authorized user, send the encrypted command to the smart card via the encrypted channel.

17. The non-transitory computer readable medium according to claim 15, further comprising machine readable instructions, when executed, further cause the at least one physical processor of the user input apparatus to:

determine whether a contact part disposed on a first panel of the user input apparatus is disposed in an engaged or a disengaged position relative to another contact part disposed on a second panel of the user input apparatus; and in response to a determination that the contact part disposed on the first panel of the user input apparatus is disposed in the disengaged position relative to the another contact part disposed on the second panel of the user input apparatus, change encrypted channel information on the user input apparatus to a user-defined value not equal to zero.

18. The non-transitory computer readable medium according to claim 17, further comprising machine readable instructions, when executed, further cause the at least one physical processor of the user input apparatus to:

use the encrypted channel information to establish the encrypted channel with the smart card.

19. The non-transitory computer readable medium according to claim 15, further comprising machine readable instructions, when executed, further cause the at least one physical processor of the user input apparatus to:

determine whether a front panel of the user input apparatus is in alignment with a back panel of the user input apparatus; and in response to a determination that the front panel of the user input apparatus is not in alignment with the back panel of the user input apparatus, change the encrypted channel information on the user input apparatus to zero.

20. The non-transitory computer readable medium according to claim 15, further comprising machine readable instructions, when executed, further cause the at least one physical processor of the user input apparatus to:

access the plurality of key components from the plurality of smart cards; and generate the Master File Key using the plurality of key components.

* * * * *